United States Patent
Dhoolia et al.

(10) Patent No.: US 10,235,330 B2
(45) Date of Patent: Mar. 19, 2019

(54) PROCESS MANAGEMENT USING REPRESENTATION STATE TRANSFER ARCHITECTURE

(75) Inventors: Pankaj Dhoolia, Uttar Pradesh (IN);
Fenno F. Heath, III, Woodbridge, CT (US); Santhosh B. Kumaran, Peekskill, NY (US); Rong Liu, Sterling, VA (US); Prabir Nandi, Johns Creek, GA (US); Florian Pinel, New York, NY (US)

(73) Assignee: Intenational Business Machines Corporation, Armonk, NY (US)

( * ) Notice: Subject to any disclaimer, the term of this patent is extended or adjusted under 35 U.S.C. 154(b) by 409 days.

(21) Appl. No.: 13/425,713

(22) Filed: Mar. 21, 2012

(65) Prior Publication Data

US 2012/0179825 A1    Jul. 12, 2012

Related U.S. Application Data

(62) Division of application No. 12/209,587, filed on Sep. 12, 2008.

(51) Int. Cl.
*G06F 15/16* (2006.01)
*G06Q 10/06* (2012.01)
*H04L 29/08* (2006.01)

(52) U.S. Cl.
CPC ....... *G06F 15/16* (2013.01); *G06Q 10/06313* (2013.01); *H04L 67/142* (2013.01)

(58) Field of Classification Search
CPC ....... G06F 9/444; G06F 9/5038; H04L 67/02; H04L 67/16

(Continued)

(56) References Cited

U.S. PATENT DOCUMENTS 6,038,590 A * 3/2000 Gish .................. 709/203
6,434,598 B1 * 8/2002 Gish .................. 709/203

(Continued)

FOREIGN PATENT DOCUMENTS

WO   WO2008032070   3/2008

OTHER PUBLICATIONS

Fielding, R. T. "Architectural Styles and the Design of Network-based Software Architectures" Doctoral Dissertation, UC Irvine, 2000. pp. 52-90.*

(Continued)

*Primary Examiner* — Joshua Joo
(74) *Attorney, Agent, or Firm* — David M. Quinn; Ryan, Mason & Lewis, LLP

(57) ABSTRACT

Process management techniques using a representation state transfer architecture include, for example, a method of managing a given process in a data-centric manner in a client/server environment, comprising at least one client and at least one server. In an exemplary method, the server obtains from the client at least one request associated with the given process. In response to the request obtained from the client, the server generates an entity, wherein the generated entity is represented in terms of a data model and a lifecycle model associated therewith, wherein the lifecycle model comprises states and state transitions with each transition caused by one or more activities in the given process, and wherein the given process is represented as a collection of communicating entities. The server sends a response to the at least one request to the client, wherein the response is based at least in part on the generated entity.

18 Claims, 10 Drawing Sheets

(58) Field of Classification Search
USPC .......................................................... 709/203
See application file for complete search history.

(56) References Cited

U.S. PATENT DOCUMENTS

| | | | |
|---|---|---|---|
| 6,662,355 B1 | 12/2003 | Caswell et al. | |
| 7,072,800 B1 | 7/2006 | Fernandez et al. | |
| 7,222,302 B2 | 5/2007 | Hauser et al. | |
| 7,698,398 B1* | 4/2010 | Lai ................................ | 709/223 |
| 7,802,264 B2* | 9/2010 | Robertson et al. ........... | 709/215 |
| 8,069,435 B1* | 11/2011 | Lai ................................ | 717/106 |
| 2002/0188538 A1* | 12/2002 | Robertson et al. ............. | 705/35 |
| 2004/0107125 A1 | 6/2004 | Guheen et al. | |
| 2005/0091093 A1 | 4/2005 | Bhaskaran et al. | |
| 2005/0155042 A1* | 7/2005 | Kolb et al. .................... | 719/318 |
| 2007/0162482 A1 | 7/2007 | Flaxer et al. | |
| 2007/0233580 A1* | 10/2007 | Pike et al. ....................... | 705/26 |
| 2008/0201333 A1* | 8/2008 | Rowley ............................ | 707/10 |
| 2008/0301135 A1 | 12/2008 | Alves et al. | |
| 2009/0070786 A1 | 3/2009 | Alves et al. | |
| 2009/0177957 A1* | 7/2009 | Bouillet et al. ............... | 715/230 |
| 2009/0187889 A1* | 7/2009 | Kuester ..................... | G06F 8/10 717/125 |
| 2009/0193433 A1* | 7/2009 | Maes ..................... | G06Q 10/06 719/315 |
| 2009/0228886 A1* | 9/2009 | Kowalkiewicz ....... | G06Q 10/06 718/100 |
| 2010/0058337 A1* | 3/2010 | Lloyd ............................... | 718/1 |

OTHER PUBLICATIONS

Pautasso, Cesare, "BPEL for REST", Pub. Date: Jun. 19, 2008, pp. 1-17.*
Pautasso, Cesare, "BPEL for REST Slide Presentation", Pub. Date: Sep. 4, 2008, pp. 1-28.*
Oasis, "Web Services Business Process Execution Language Version 2.0", Pub. Date: Apr. 11, 2007, pp. 1-264.*
W.M.P. Van Der Aalst et al., "Workflow Patterns," Distributed and Parallel Databases, Jul. 2003, pp. 1-70, vol. 14 No. 3.
T. Andrews et al., "Business Process Execution Language for Web Services," http://www.ibm.com/developworks/library/specification/ws-bpel/, May 2003, 136 pages, Version 1.1.
L. Cherbakov et al., "Impact of Service Orientation at the Business Level," IBM Systems Journal, 2005, pp. 653-668, vol. 44, No. 4.
R.T. Fielding, "Architectual Styles and the Design of Network-based Software Architectures," Dissertation, www.ics.uci.edu, 2000, 90 pages, California.
J.E. Hanson et al., "Conversation Support for Business Process Integration," Procs. of the 6th International Enterprise Distributed Object Computing (EDOC), 2002, 10 pages, Switzerland.
J. Koehler et al., "Declarative Techniques for Model-Driven Business Process Integration," IBM Systems Journal, 2005, pp. 47-65, vol. 44, No. 1.
S. Kumaran et al., "On the Duality of Information-Centric and Activity-Centric Models of Business Processes," CAiSE 2008, pp. 32-47.
R. Liu et al., "An Analysis and Taxonomy of Unstructured Workflows," Business Process Management (BPM), 2005, pp. 268-284.
M. Zur Muehlen et al., "Developing Web Services Choreography Standards, The Case of Rest vs. SOAP," Decision Support Systems, 2004, 35 pages, vol. 40, No. 1.
J. Ricker et al., "Asynchronous Service Access Protocol (ASAP)," Version 1.0, Working Draft G, Standards Specification Organization for the Advancement of Structured Information Standards, Advanced E-Business, Jun. 2004, 43 pages.
R.J. Auburn et al., "State Chart XML (SCXML): State Machine Notation for Control Abstraction 1.0," W3C WOrking Draft, Jul. 2005, 25 pages.
J. Wang et al., "A Framework for Document-Driven Workflow Systems," BPM, 2005, pp. 285-301.
E. Christensen et al., "Web Services Describtion Language (WSDL)," Version 1.1, W3C Note, Mar. 2001, http://www.w3.org/TR/wsdl, 31 pages.
D. Hollingsworth, "Workflow Management Coalition, The Workflow Reference Model," Issue 1.1, Jan. 1995, 55 pages, U.K.
O. Zimmerman et al., "Service-Oriented Architecture and Business Process Choreography in an Order Management Scenario: Rationale, Concepts, Lessons Learned," OOPSLA, Oct. 2005, 12 pages, California.
R.N. Khan, "Business Process Management: A Practical Guide," www.businessanalysisbooks.com, Sep. 2004, 3 pages.
G.H. Mealy, "A Method for Synthesizing Sequential Circuits," Wikipedia, 1955, 2 pages.
U.S. Appl. No. 11/945,297 filed in the name of G. Kar et al. on Nov. 27, 2007 and entitled "Automatic Generation of Executable Components From Business Process Models."

* cited by examiner

FIG. 5
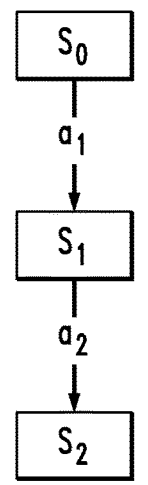
(a) SEQUENCE
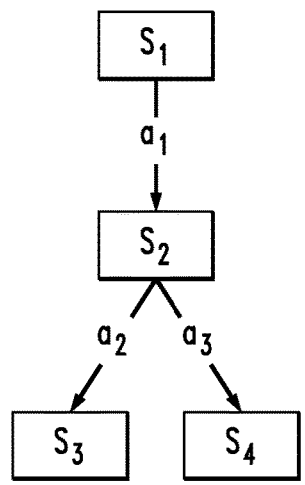
(b) EXCLUSIVE CHOICE
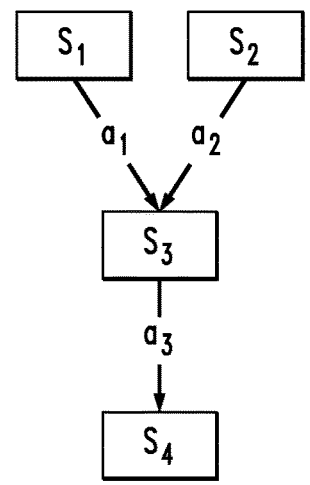
(c) SIMPLE MERGE
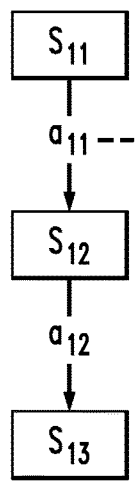
(d) PARALLEL-SPLIT
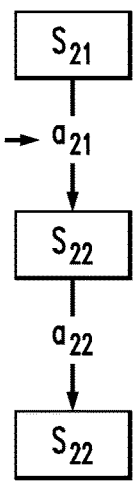
(e) SYNCHRONIZATION

FIG. 8

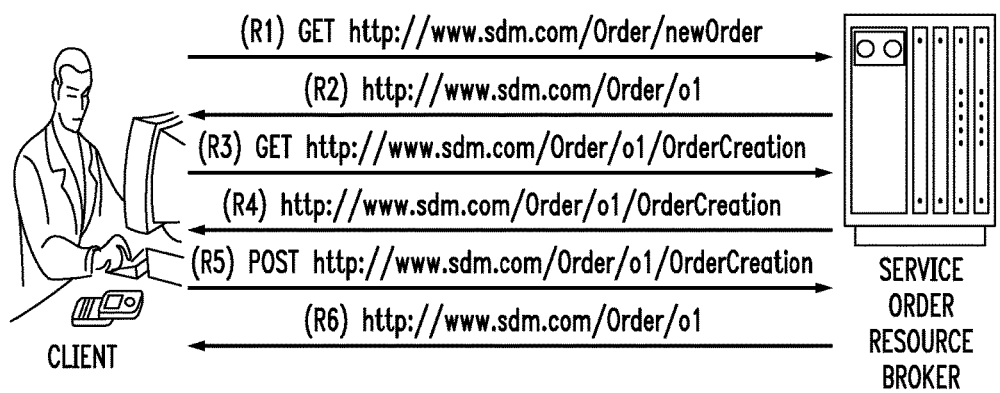

FIG. 9(a)

```
<?xml version="1.0"?>
<so:ServiceOrder xmlns:so="http://www.sdm.com"
xmlns:xlink="http://www.w3.org/1999/xlink">
    <orderID>o1</orderID>
    <currentState>initial</currentState>
    <ServiceOffering/>
        ....
    <Options>
      <Option name="Create Order"
            xlink:href="/Order/o1/OrderCreation"/>
    </Options>
    <OriginServer>www.sdm.com</OriginServer>
    <Protocol>HTTP</Protocol>
</so:ServiceOrder >
```

FIG. 9(b)

```xml
<?xml version="1.0"?>
<so:ServiceOrder xmlns:so="http://www.sdm.com"
xmlns:xlink="http://www.w3.org/1999/xlink">
    <orderID>o1</orderID>
    <currentState>created</currentState>
    <ServiceOffering name="Something"
        xlink:href="/Order/o1/ServiceOffering/offering1"/>
    <Options>
      <Option name="Validate Order"
            xlink:href="/Order/o1/OrderValidation"/>
      <Option name="Cancel Order"
            xlink:href="/Order/o1/OrderCancellation"/>
      <Option name="Reject Order"
            xlink:href="/Order/o1/OrderRejection"/>
    </Options>
    <OriginServer>www.sdm.com</OriginServer>
    <Protocol>HTTP</Protocol>
</so:ServiceOrder >
```

PROCESS MANAGEMENT USING REPRESENTATION STATE TRANSFER ARCHITECTURE

CROSS-REFERENCE TO RELATED APPLICATION

This application is a Divisional of U.S. patent application Ser. No. 12/209,587, filed on Sep. 12, 2008, the disclosure of which is fully incorporated herein by reference.

FIELD OF THE INVENTION

This invention relates to the field of process management and, more particularly, to creating process management systems using a representation state transfer architecture.

BACKGROUND OF THE INVENTION

In general, a "process" may, for example, be defined as a set of linked activities that take an input and transform it to create an output. Typically, such a transformation should add value to the input and create an output that is more useful and effective to the recipient.

Specifically, in an enterprise domain, wherein an enterprise is known, for example, to be an organizational entity designed to provide goods and/or services to consumers or corporate entities such as governments, charities or other businesses, a process may be referred to as a "business process." A business process is thus known, for example, to be a specific ordering of activities designed to produce a specific output, given specific input, for a particular customer or market.

Enterprises are constantly attempting to design and manage such processes in order to improve usefulness and efficiency of the process output.

SUMMARY OF THE INVENTION

Principles of the invention provide process management techniques using a representation state transfer architecture that manages a given process in a data-centric manner.

For example, in one embodiment, a method of managing a given process in a data-centric manner in a client/server environment, comprising at least one client and at least one server, comprises the following steps. The server obtains from the client at least one request associated with the given process. In response to the request obtained from the client, the server generates an entity (by way of example only, a "business entity" as used herein), wherein the generated entity is represented in terms of a data model and a lifecycle model associated therewith, wherein the lifecycle model comprises states and state transitions with each transition caused by one or more activities in the given process, and wherein the given process is represented as a collection of communicating entities. The server sends a response to the at least one request to the client, wherein the response is based at least in part on the generated entity. It is to be understood that the entity generated by the server may be a new entity, i.e., one that did not exist prior to this request, or it may be an existing entity that is manipulated (changed in some way) so as to generate a manipulated entity.

Advantageously, based on the way in which entities are represented in accordance with principles of the invention, resources for the given process are exclusively defined as such entities so that the only resources that a client or a server participating in the given process need to interact with are one or more of the entities, thus greatly simplifying process management.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 5(a) through 5(e) show the representation of common control flows in business processes for use in illustrating principles of the invention.

FIG. 8 shows a typical execution scenario in a representation state transfer business process management architecture according to principles of the invention.

FIG. 9 shows response messages in a representation state transfer business process management architecture according to principles of the invention.

DETAILED DESCRIPTION OF PREFERRED EMBODIMENTS

Figure 1:
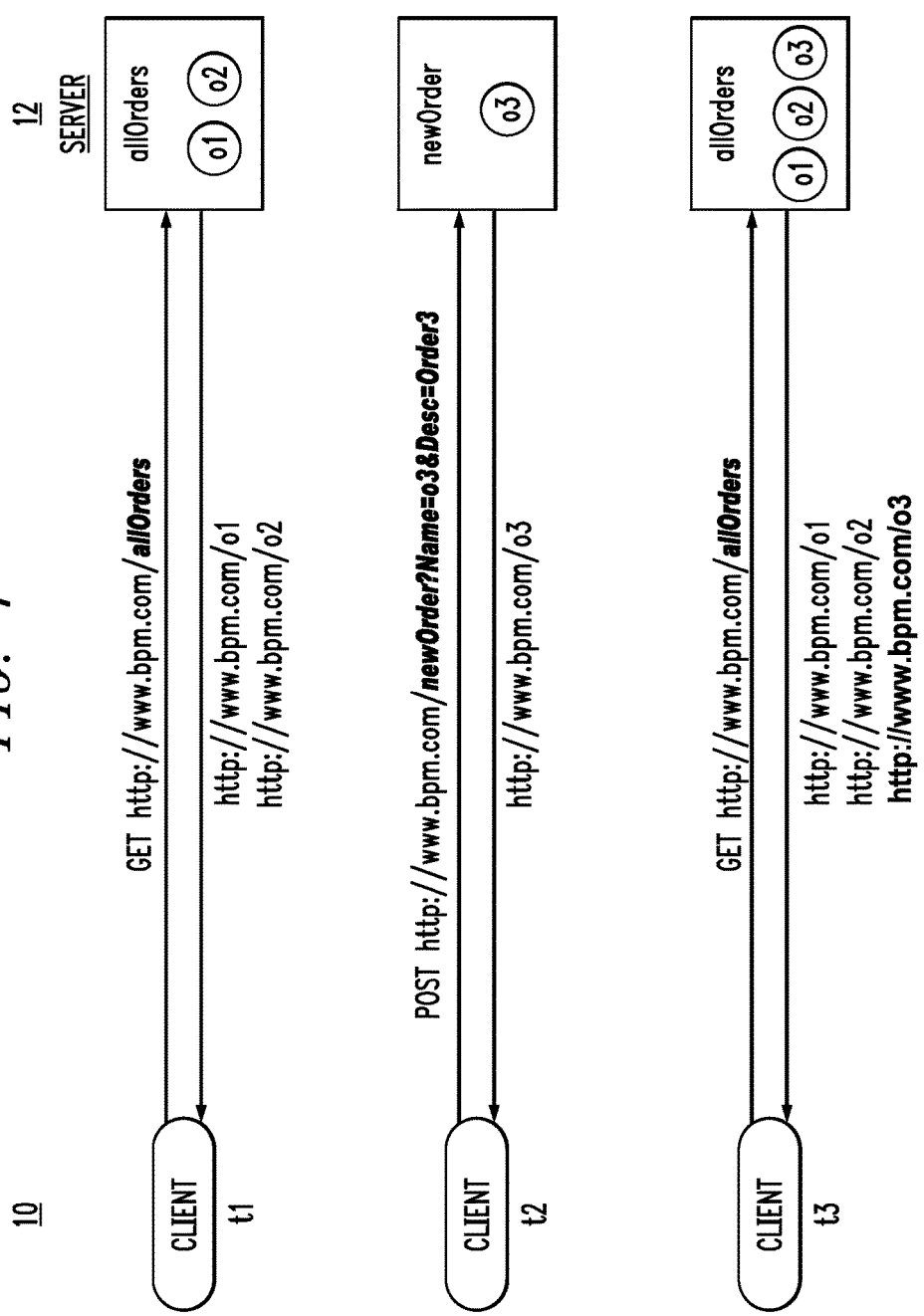
FIG. 1 shows an example of an order management application for use in illustrating principles of the invention.

It is to be appreciated that while illustrative embodiments below will be described in terms of enterprise or business process management, techniques of the invention are not limited thereto and may therefore be applicable to any suitable process management domains.

In the business entity domain, existing solutions tend to focus on identification of business entities, or equivalently business artifacts (see, e.g., U.S. patent application Ser. No. 11/945,297 filed on Nov. 27, 2008 in the name of S. Kumaran et al, and entitled "Automatic Generation of Executable Components from Business Process Models," the disclosure of which is incorporated by reference herein), the modeling of business entities (see, e.g., U.S. Pat. No. 6,662,355 to N. S. Caswell et al., "Method and System for Specifying and Implementing Automation of Business Process," the disclosure of which is incorporated by reference herein, as well as the above-referenced S. Kumaran et al.), the implementation of business entities, and business service design using business entities (see, e.g., U.S. Patent Publication No. 2007/0162482A1 to D. B. Flaxer et al., "Method and System of Using Artifacts to Identify Elements of a Component Business Model," the disclosure of which is incorporated by reference herein).

In the above-referenced S. Kumaran et al., an algorithm is developed to discover business entities from activity-centric business process models. The above-referenced U.S. Pat. No. 6,662,355 describes the technical specifications of business entities. From the implementation perspective, techniques have been developed to create end-to-end solutions for business-entity centric business processes following a model-driven transformation approach (see, e.g., U.S. Patent Publication No. 2005/0091093A1 to Bhaskaran et al., "End-to-End Business Process Solution Creation," and U.S. Pat. No. 7,222,302 to R. F. Hauser et al., "Method and Apparatus for Generating IT Level Executable Solution Artifacts from the Operational Specification of a Business," the disclosures of which are incorporated by reference herein). The above-referenced U.S. Pat. No. 7,222,302 also describes an approach to implementing business entities as adaptive business objects (ABO), which are composed of state machines and data graphs. Finally, the above-referenced U.S. Patent Publication No. 2007/0162482A1 describes a method of applying business entities to define business services for business components.

As will be described herein, illustrative embodiments of the invention provide for implementation of business entity-centric business processes using a representation state transfer (REST) architecture. The implementation architecture is grounded on the principles of REST since the focus of a REST-based application is on resources.

Principles of the invention describe and orchestrate resources in an enterprise or business process domain. Such inventive principles further extend the REST implementation framework by treating business entities as objects at both the modeling and the implementation level and then avoiding the transformations required by the existing model driven transformation approach. In addition, in accordance with principles of the invention, business services are naturally defined at the transitions of business entity state machines, instead of customization points as in the ABO technique. Also, in accordance with principles of the invention, business services definitions contain information at both coarse-grained and fine-grained service interfaces. Advantageously, in accordance with the inventive implementation architecture, several desirable features, like flexibility and adaptability, can be achieved.

In the REST domain, existing solutions mainly focus on REST style web services, which use generic interfaces, such as HTTP (HyperText Transport Protocol) POST and GET to get resources, but the detailed resource structures and representation generation is taken for granted. For example, in International Patent Publication No. WO2007/0233580A1 to M. Pike et al., "Integrated Retailer Processes," the disclosure of which is incorporated by reference herein, retail web service provides REST-style web services. International Patent Publication No. WO2008/032070A1 to P. J. Rodgers et al., "Method for Locating, Resolving and Invoking Software Functions," the disclosure of which is incorporated by reference herein, describes a method to locate and generate a resource representation, for example, an image of geographical location. However, this type of resource representations does not need to enable business transactions.

Different from the above, principles of the invention define the resource space for business process domain as a collection of business entities. In our approach, a resource broker, rather than "context" or "endpoints," processes the requests for resources and generates resource representations which can enable clients to make business transactions.

For the sake of clarity of reference, the remainder of the detailed description is organized as follows. Sections 1 and 2 introduce REST with respect to business process management (BPM). Section 3 describes a process example and Section 4 discusses "RESTful" BPM with illustrative details. In section 5, we provide an analysis of our approach, compare it with other approaches, and highlight its desirable features. Section 6 describes an illustrative computer system for implementing system components.

1. Introduction

Business Process Management (BPM) encompasses the methods, tools, and runtime systems that support the modeling, automation, management, and optimization of business processes of an enterprise. The emergence of highly dynamic and distributed business models has necessitated the need for highly flexible and scalable BPM systems. Service Oriented Architecture (SOA) is generally believed to be the foundation on which such BPM systems could be built. At the heart of SOA is the abstraction of a service that links business to IT (information technology), i.e., links aspects of the business concept to aspects of the technical facilities used to implement the business concept. In essence, a business process is composed of business services which are IT-enabled by mapping to IT services. Thus, technologies for orchestrating IT services towards the end-to-end execution of business processes play an important role in SOA based solutions. The Business Process Execution Language (BPEL) is widely recognized as the de facto SOA orchestration language. However, industry practices often find difficulties in using BPEL to support flexible, scalable, and dynamic business process management.

The World Wide Web provides an excellent example of a highly scalable, flexible, and successful distributed computing platform. The execution model of the Web is based on an architectural style called Representational State Transfer (REST). In an effort to transfer the success of the Web to the BPM domain, a proposal for REST-based design of BPM systems is described in Muehlen et al., "Developing Web Services Choreography Standards, the case of *REST* vs. *SOAP*," Decision Support Systems 40(1): 9-29, 2005, the disclosure of which is incorporated by reference herein. Muehlen et al. applies REST architecture to cross-organizational workflows. However, the main problem of applying REST architecture to BPM is the lack of an effective mechanism for managing a large number of objects or resources in a process. It is known that the Muehlen et al. approach can lead to a large number of objects and, as a result, managing the URI (uniform resource indicator) namespace can become cumbersome. Consequently, few business processes are implemented using REST architecture according to Muehlen et al.

Principles of the invention define an improved REST-based architecture for BPM that is fundamentally different from existing work in this area. REST-style workflows maintain the activity-centric modeling paradigm and use REST primarily to provide client access to activity instances via generic interfaces. In contrast, principles of the invention employ an information-centric approach to modeling business processes. The "resources" in our REST architecture are not workflow activity instances (verbs) but information entities (nouns). We call our approach RESTful BPM. We illustrate this approach using a real world business process in service delivery management. In addition, we show how this approach can support desirable features, such as process adaptability, backward navigation and conversational business services.

2. REST Architecture and BPM

As an architectural style, REST is intended to evoke an image of how a well-designed web application behaves: a network of web pages (a virtual state-machine), where the user progresses through an application by selecting links (state transitions), resulting in the next page (representing the next state of the application) being transferred to the user and rendered for their use. REST has several unique features, three of which are of particular importance here and are discussed below using an order management application shown in FIG. 1 as an illustrative example.

1. REST-based applications are developed with resources as the core abstraction. This is fundamentally different from object-oriented applications or procedural applications. A resource is any information that can be named and it maps to a set of values that may change with time. For example, in FIG. 1, the users (at client device 10) of the order management application may use a resource named "allOrders" to track all active orders in the system. At time t1, the resource "allOrders" is requested using the GET method and the result returned by the system server 12 to the client 10 is a set of URIs that are mapped to orders {o1, o2}. A resource may also be used to represent entities that do not yet exist. For example, in FIG. 1, at time t2, a resource named "newOrder" is requested to create a new order "o3" using the POST method along with parameters, e.g., the name and the description of the new order. Then, a new order named "o3" is created and a URI pointing to it is returned. Therefore, at time t3, when the resource "allOrders" is requested again, this resource is mapped to {o1, o2, o3}.

2. Each resource is uniquely identified using a Uniform Resource Identifier (URI) and managed by an origin server. Clients retrieve an application state from the server by invoking a request on a URI. In response to this request, application state is transferred from the server to the client via resource representations.

3. Clients communicate with the servers using generic interfaces. For example, Web clients communicate with Web servers using four generic HTTP methods: GET, POST, PUT and DELETE. Further details of REST architecture can be found in R. T. Fielding, "Architectural Styles and the Design of Network-based Software Architectures," Doctoral Dissertation, University of California, Irvine, 2000, the disclosure of which is incorporated by reference herein.

The above example gives a very natural description of an order management application as observed by a client. However, BPM is concerned with enforcing the correct execution of business processes across an enterprise as defined in process models. A typical BPM system, for example, a WfMC workflow management system shown in FIG. 2 (including client 10 and server 12), contains a process factory which creates process instances 15 based on process models 14, and process engines which manage the execution of process instances and instance data. In general, this architecture involves four types of information: (1) process models 14, (2) internal control data 16, including states of process instances and activities, checkpoints, and recovery information during execution, (3) case data 17, e.g., decision data or parameters passed between activities, and (4) application data 19 used by external applications 18 that interact with processes.

When mapped naively to the REST architecture, these four types of data become resources. As a simple illustration, assuming that a process has ten activities and each activity uses five data items, with the architecture in FIG. 2, each process instance generates ten resource objects for activities and each activity instance produces (or requires) five data resource objects, leading to at maximum 50 resource objects in total per process instance. For n process instances, the maximum number of resource objects is $50^n$. Moreover, these resource objects are distributed among processes and applications. One may have to trace down process instances to locate resource objects and the interpreting of these objects is complicated as usually there are no unified data structures across processes and applications in workflow systems. Therefore, this approach leads to a big challenge in generating consumable resource representations that business users can understand and act on. An understandable and actionable representation typically requires consolidating various types of data.

For example, in order to generate the response at t2 in FIG. 1, BPM needs to retrieve the content of the order (e.g., order number, ordered items) from the order application and combine it with control data, case data and the process model to determine next possible application states displayed as links (e.g., links to modify the order, to complete missing information, or to delete the order). Without a proper mechanism for managing, consolidating and interpreting resources, representations can only be created in an ad-hoc manner.

Thus, such a REST-style implementation of workflow management systems by simply mapping information used in a process into resources leads to two major problems. The first has to do with structuring resources and generating representations such that business actors can easily perform business actions. REST or REST-style workflows provide no guidelines for doing so. The second issue deals with enforcing business process logic. REST views the behavior of an application as a virtual state machine. However in the BPM context, such a state machine should be defined to reflect the behavior of business processes, with business policies and activity dependencies properly enforced. The application behavior is only the projection of some aspects of the process behavior to the clients.

For example, in FIG. 1, a client may just see application states as order created, rejected or fulfilled, but the order process may have a richer behavior and some aspects of the behavior may be hidden from the client. Therefore, an approach to defining such process behavior via state machines is needed. Next, we introduce RESTful BPM and demonstrate how our approach can overcome these challenges, starting with a process example.

3. Illustrative Business Process—Service Delivery Management (SDM)

Figure 3:
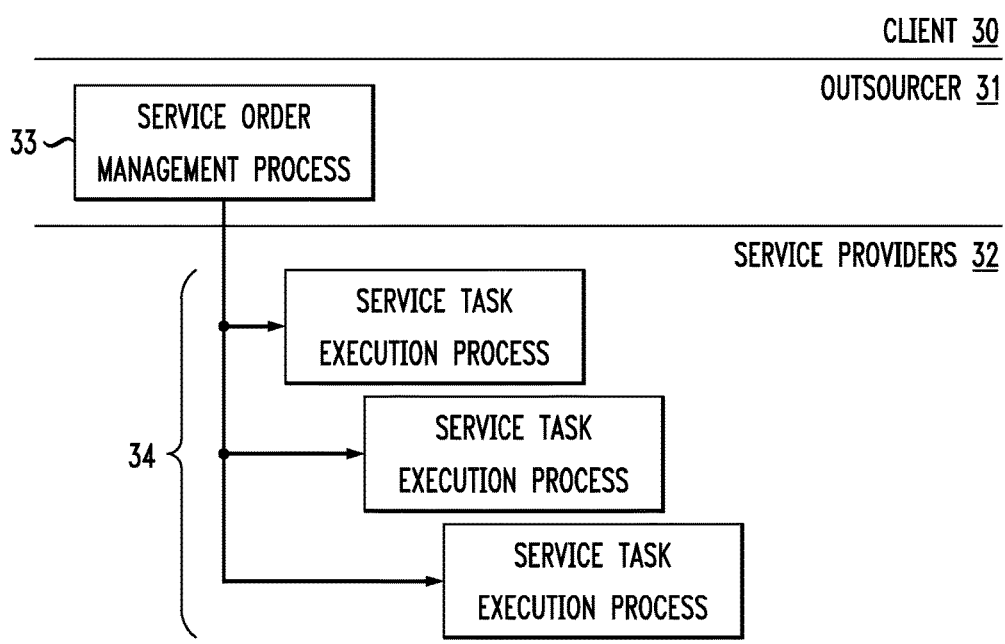
FIG. 3 shows an example of a service delivery management application for use in illustrating principles of the invention.

In this section we present a real world BPM problem in service delivery management (SDM) as an illustrative example. SDM processes are used to fulfill IT service requests. Three types of organizations are involved in these processes: (1) client organizations 30 request services through various client-specific tools; (2) outsourcers 31 are strategic outsourcing business units and a single outsourcer may support a large number of clients; and (3) service providers 32 actually fulfill a service request. Service providers can be internal to the SDM business or external entities. An end-to-end service fulfillment scenario comprises two types of business processes as shown in FIG. 3 by their organizations.

Service order management process 33: This process is initiated when an outsourcer receives a service request from a client. This process creates a service order to fulfill the request, and manages the end-to-end lifecycle of this order, including entitlement verification, plan generation, order approvals, plan execution, plan reconciliation and order close-out.

Service task execution processes 34: These processes coordinate the work performed by service providers to fulfill a service order. Several such processes may be initiated in the plan execution phase of a service order management process. Depending on the type of a service order, service providers may use different execution processes.

The SDM processes have three unique features. First, they require a high level of flexibility and scalability, as their complexity varies by service orders. A complicated service order can engage a number of service providers. Second, these processes involve many backward navigation scenarios, where a process execution steps back to previously executed activities. For example, if a request for change (RFC) arrives during a service order execution, this service order may need another round of entitlement verification, plan generation, or order approval. Essentially, many cycles are introduced during the process execution and these cycles may not be properly nested. Finally, the execution of these processes requires conversational interactions between the client and the server. For example, during the end-to-end processing of a service order, the outsourcer users are engaged in a conversation with the server that constitutes multiple service invocations in unpredictable sequence as opposed to a single fire-and-forget service invocation. The need to support these features imposes challenges in implementing an SDM system.

4. RESTful BPM

To overcome the difficulties in managing resources and provide process scalability in the BPM context, we reconsider the approach to defining process models. A business process model describes actions performed by business actors (human or system) to achieve a business goal. Although it is well accepted that business processes integrate control, data and resources, process models typically focus on control flows with less attention paid to other dimensions. Often, data is defined within the scope of constituent activities as input and output attributes. As a result, BPM systems face a heavy burden to manage data that is distributed within the scope of business activities. In our approach, instead of focusing on control flows, we take an information-centric perspective and view a process model as a set of communicating behavior models of business entities. This new perspective is grounded on the principles of REST since the hallmark of a REST-based application is the focus on resources, with a resource being any information that can be named.

4.1 Information-Centric Process Models

A business process may involve a large number of data entities. Among these entities, typically, just a few have lifecycles where each state is meaningful to business users and state transitions are achieved by process activities. We define these entities as business entities.

Definition 1 (Business Entities): Given a set of business processes, a business entity is a data entity with a data model and a lifecycle model which includes states and state transitions with each transition caused by one or more activities in the business processes.

Figure 2:
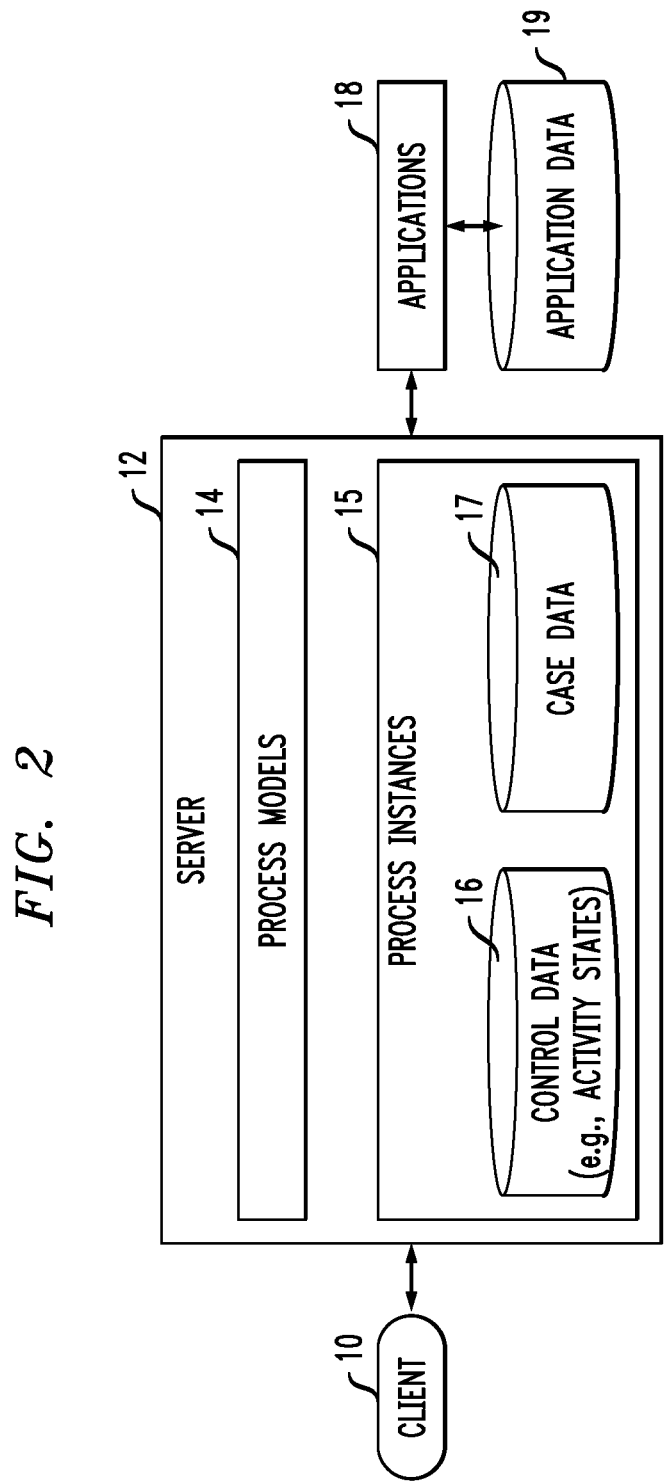
FIG. 2 shows an example of a workflow management system for use in illustrating principles of the invention.

For example, the SDM processes in FIG. 2 involve a large number of data entities, including service orders, service level agreements, service tasks, service plans, service catalogs, policies and other information. But only service order and service task have lifecycles with states and state transitions caused by the activities in the processes. Therefore, service order and service task are the business entities in SDM processes.

Business entities can be thought of as an abstraction that componentizes the information domain of a business such that the lifecycle models associated with these components fully capture the business process functionality. Very often, we observe that a few data entities, for example, service order and service task in SDM, serve as key drivers of the flow of most activities in a business process, and the process itself is viewed as the process of these entities walking through their lifecycles, from their initial states to their final states. A technique has been developed to analyze business processes and discover such entities, see the above-referenced U.S. patent application Ser. No. 11/945,297 wherein a technique is disclosed for creating a partial order of data items used in business processes based on their relationships. A candidate business entity is the maximal one in such an ordering.

The lifecycle model of a business entity can be formally modeled as a Mealy machine (see, e.g., G. H. Mealy, "A method for synthesizing sequential circuits," Bell System Technical Journal, 34(5):1045-1079, 1955, the disclosure of which is incorporated by reference herein). A Mealy machine is composed of a finite number of states, transitions between those states, and actions performed during the transitions.

Figure 4A:
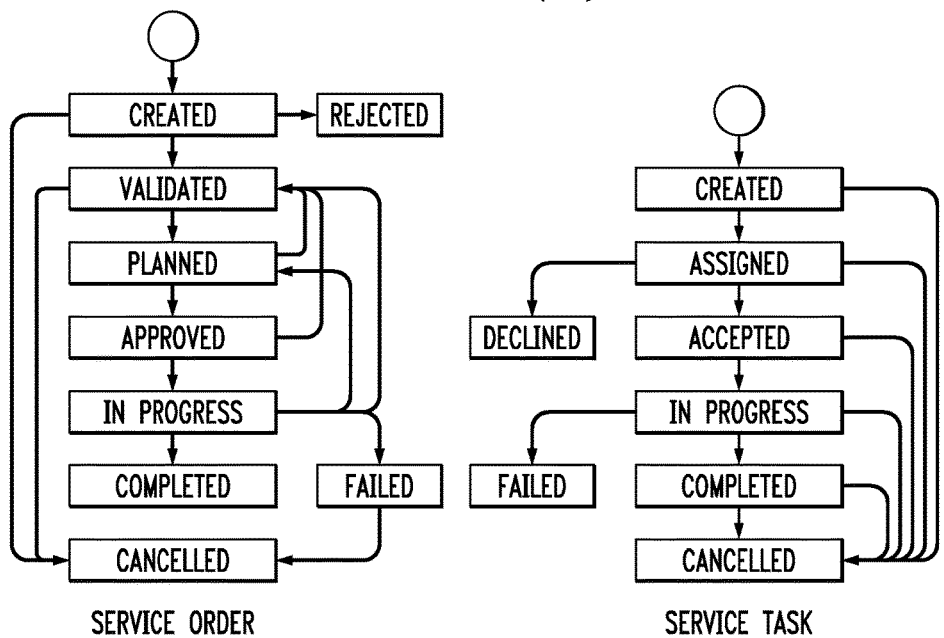
FIG. 4(a) shows state machines of two business entities in a service delivery management application for use in illustrating principles of the invention.
Figure 4B:
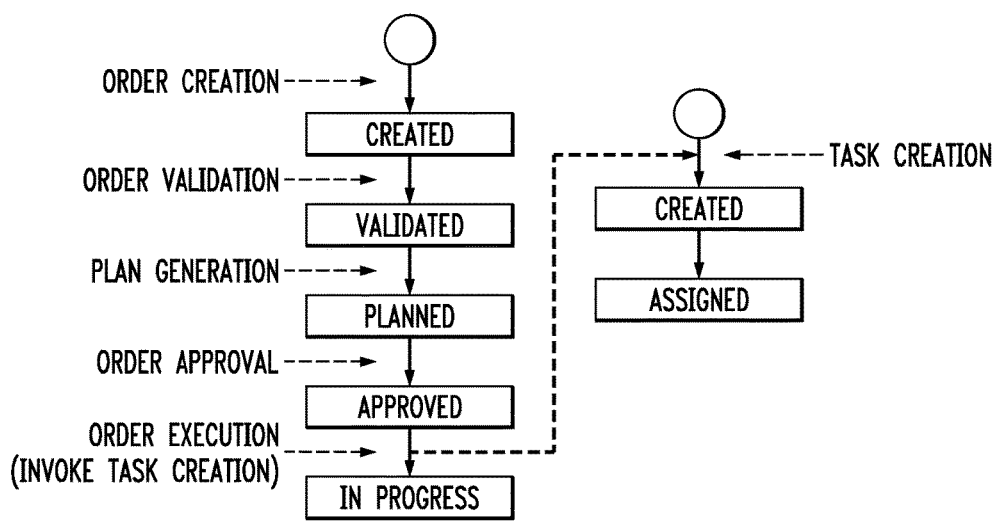
FIG. 4(b) shows a partial business process model in a service delivery management application for use in illustrating principles of the invention.

FIG. 4(a) shows the state machines of two business entities in SDM. For example, a service order has states created, validated, planned and so on. We view each state transition as defining a business service, which, when invoked, transitions the business entity from the source state to the target state. Performing an activity entails the invocations of one or more such business services. For example, an outsourcer performs the activity plan generation by invoking the business service defined by the validated-to-planned transition in the service order state machine. We can use guard conditions on state transitions to enforce business policies and data constraints. The actions performed during state transitions may trigger communications between business entities. Such communications occur when a single business activity causes state transitions on more than one business entity. For instance, in FIG. 4(b), an act of Order-Execution, not only changes the Service Order state from approved to inProgress, but also invokes TaskCreation to cause the state transition of Service Tasks from initial to created. Thus, a process can be modeled as a collection of communicating business entities.

Definition 2 (Information-Centric Business Process Models): A business process model is a set of communicating business entities. Two business entities communicate if a business service defined by one invokes another business service defined by the other.

From a control flow perspective, this process modeling approach is able to capture common control flow patterns that describe business process logic. FIG. 5 shows the representations of common control flows in terms of business entities' lifecycle models. For example, FIG. 5(a) shows a sequence pattern with three states, $s_0$, $s_1$, and $s_2$, and two business services, $a_1$ and $a_2$. Obviously, $a_1$ and $a_2$ are invoked in sequence. FIG. 5(b) gives an exclusive choice pattern, where either $a_2$ or $a_3$, but not both, is executed, as a business entity can be in only one state at a time. A simple merge pattern shown in FIG. 5(c) is just the opposite of an exclusive choice pattern. A parallel-split pattern happens with two business entities, as shown in FIG. 5(d), where after $a_{21}$ is invoked, both $a_{12}$ and $a_{22}$ can be executed in parallel. Since each of them concerns only one business entity, this parallel-split pattern can guarantee no data conflicts. Also, such a pattern does not necessarily require synchronization, as two business entities can evolve independently. FIG. 5(e) shows a synchronization pattern where $a_{12}$ invokes $a_{22}$, suggesting that $a_{11}$ and $a_{21}$ need to be completed before $a_{22}$.

An important implication of the information-centric perspective of business processes according to principles of the invention is that the resource space for BPM is radically simplified. Since business processes are perceived as the evolution of the lifecycles of the business entities, business entities are the only resources a BPM server needs to manage and the BPM clients need to manipulate. In particular, activity instances and data entities are eliminated from the resource space. Therefore, we can greatly simplify the mechanism for managing resources in RESTful BPM.

4.2 Resources

Figure 6:
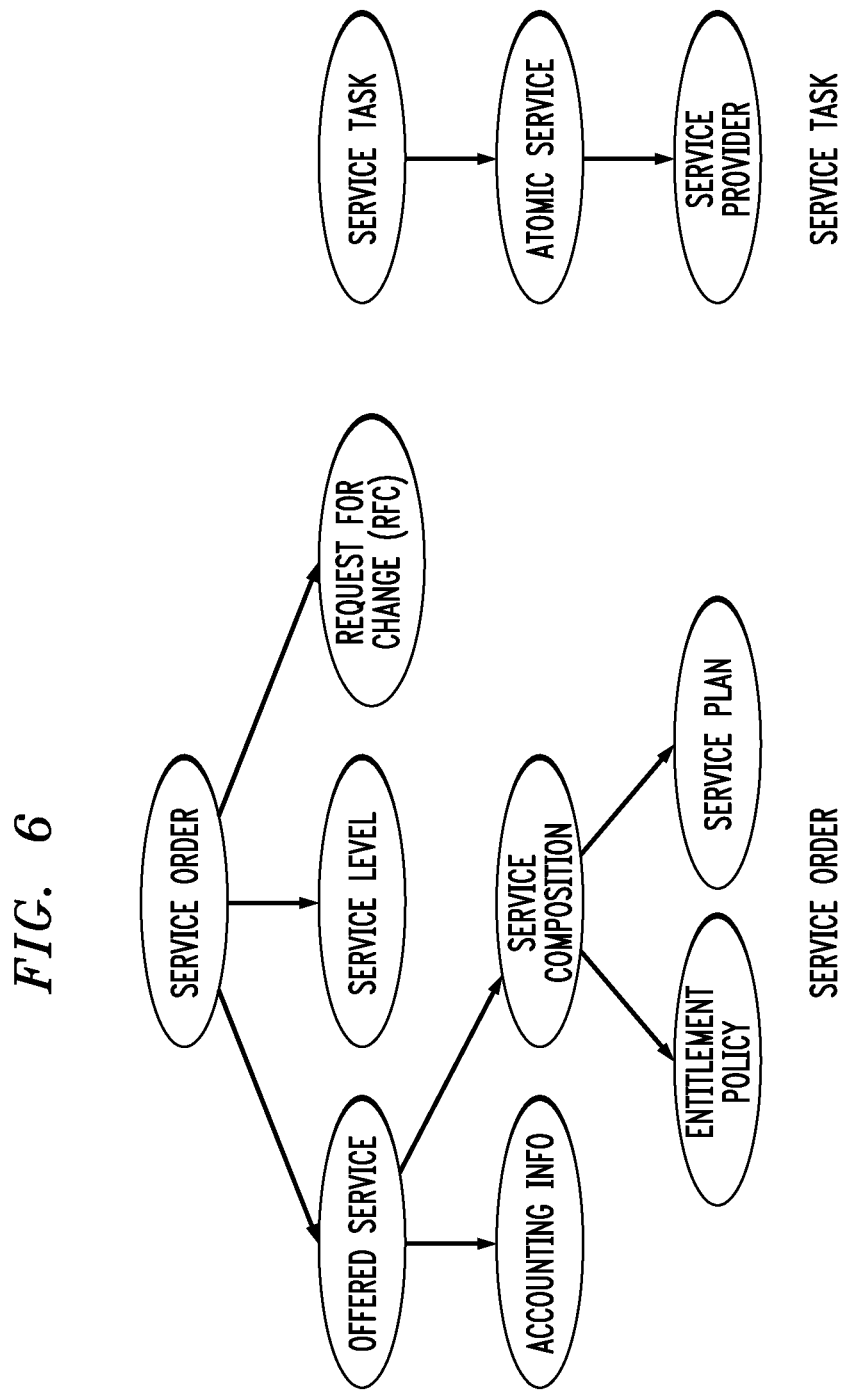
FIG. 6 shows data models of business entities in a service delivery management application for use in illustrating principles of the invention.

As described above, the resource space of a RESTful BPM system is composed of business entities. A RESTful BPM server may expose both instance data and metadata of a business entity via REST interfaces to the clients. Administrative clients may configure the business processes by manipulating the metadata while user agents drive business process execution by manipulating instance data. The metadata of a business entity is composed of the data model and the lifecycle model. The lifecycle model may be represented as an XML (eXtensible Markup Language) document using state machine languages, for example, State Chart eXtensible Markup Language (SCXML), see, e.g., W3C, State Chart XML (SCXML): State Machine Notation for Control Abstraction 1.0, W3C Working Draft, July 2005, the disclosure of which is incorporated by reference herein. The data model of a business entity is composed of a collection of data entities that are read, created, or updated during state transitions of the business entity. The data model is organized as a rooted tree with the data entity tagged as the business entity at the root. FIG. 6 shows the data models of business entities in SDM, namely Service Order and Service Task.

Each data model contains a number of data entities and each entity has several attributes. For simplicity, we omit the detailed content of each data entity. The relationships between data entities can be modeled using general data modeling techniques, like entity-relationship diagrams. In addition, this data model can be represented as an XML schema.

With such a data model, we can locate any piece of data used by the business process. For example, we can search for a detailed service plan for fulfilling a service order by starting at the root node of the Service Order data model and traversing the tree to the right node. Similarly, Atomic Services and Service Providers associated with a Service Task can be accessed by top-down navigation from the root node.

In RESTful BPM according to principles of the invention, a business service is defined by a state transition in a business entity's lifecycle model. This business service can be invoked when the business entity is in the source state of the transition. A representation can be generated based on the content of the business entity and users can use this representation to provide input messages to invoke the service. For example, a client invokes a service to validate an order as follows. First, the client retrieves a representation of the order from the server by issuing a request on the URI of the order (e.g., GET HTTP://www.sdm com/Order/o1). It then uses this representation to post validation data to the server (e.g., POST HTTP://www.sdm.com/Order/o1?para=<validation data>). Therefore, each activity (e.g., validating order) in RESTful BPM is a service invocation and it can be accessed through resource representations of business entities. There is no need for identifying an activity as a static resource. This characteristic distinguishes our RESTful BPM from REST-style workflows (see the above-cited Muehlen et al. reference), where each activity is a static resource.

4.3 Resource Brokers

In the REST architecture, a user agent communicates with origin servers (e.g., web servers) using uniform resource identifiers (URIs) to retrieve resource representations (see the above-cited R. T. Fielding reference). An origin server is the definitive source for representations of a resource and also the ultimate recipient of any request that intends to modify the value of the resource. Similarly, we view the execution of a business process as a set of business services that manipulate business entity data, i.e., the resources. We introduce the notion of RESTful resource brokers to support the execution of business services. As the intermediaries between clients and physical data stores of business entities, resource brokers receive requests from clients and, based on the request type, either create a representation of the business entity and send it back to the client or update the value set associated with the resource (business entity). A resource broker can be designed as follows.

Each resource broker manages instances of a type of business entity, including their lifecycles and data. For example, SDM involves two resource brokers, one for Service Order and the other for Service Task. A resource broker provides three kinds of functions to the clients.

a. Managing resources. REST architecture defines a resource as a temporally varying membership function MR(t), which for time t maps to a set of entities, or values, which are equivalent. A resource broker essentially implements this membership function. A resource broker may support multiple resource names that map to subsets of the attributes of the associated business entity. Consider the scenario in FIG. 6 where a client creates a service order by selecting an offered service and filling in the accounting information. To support this scenario, the service order resource broker may define a resource tagged as "OrderCreation" which maps to offered services and accounting information.

b. Generate resource representations on demand. When a client requests a representation by passing a URI, a resource broker generates representations based on the lifecycle state of the business entity. The resource broker may invoke multiple application-specific functions to generate the representations. Representations are communicated as self-describing messages and are composed of data, metadata describing data, and, if necessary, metadata to describe metadata. Also, access control policies are in place to specify authorizations for accessing resources at a particular state. For example, when a client requests a representation of a service order, the service order resource broker uses the client credentials to verify that the client is authorized to view the service order in the current state before processing the request.

c. Receive and process messages from the client. Upon receiving a message, a resource broker invokes application-specific functionality to change the value set of the corresponding business entity and thus evolves the business entity. This may result in changing the current state.

4.4 RESTful BPM Architecture

Figure 7:
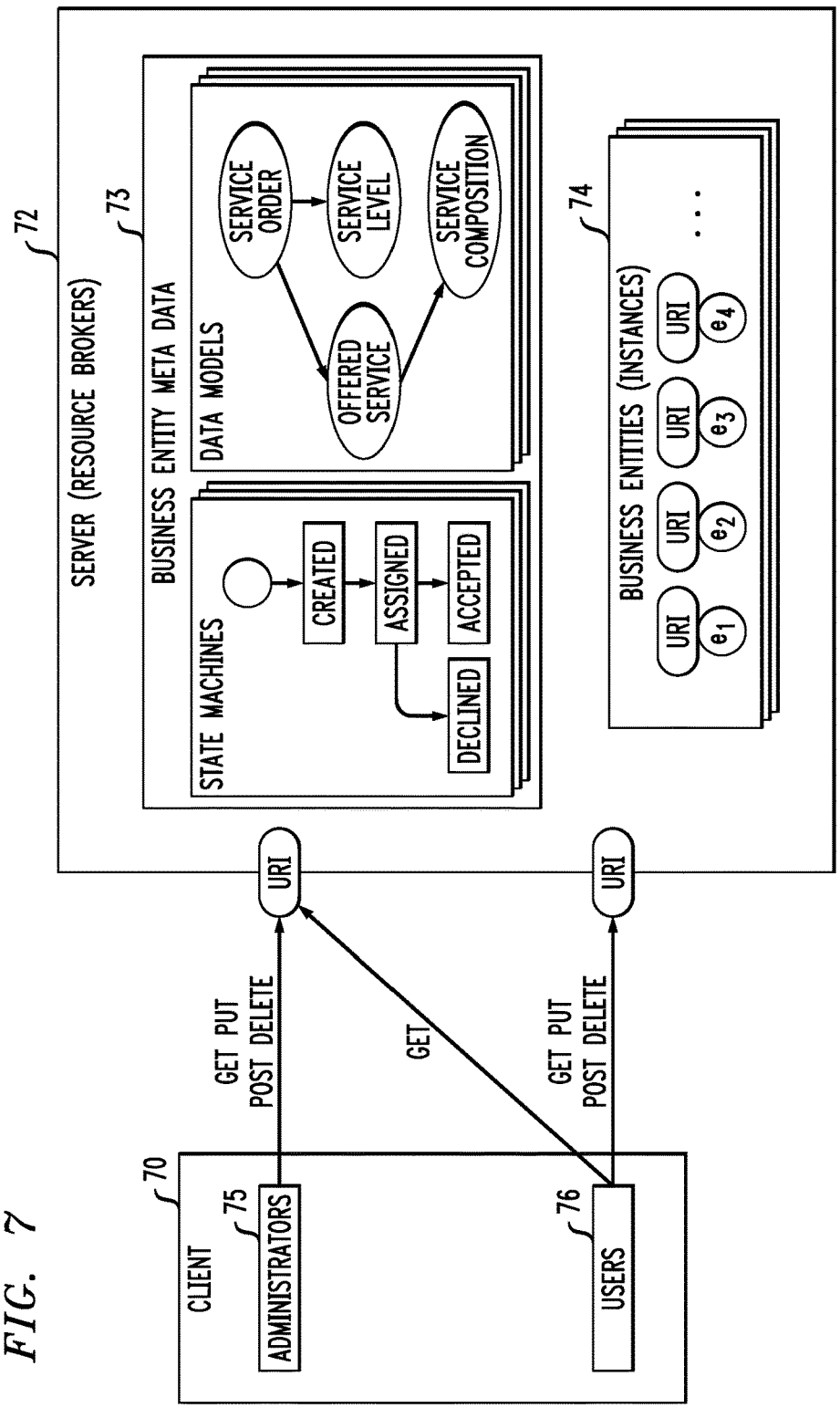
FIG. 7 shows a representation state transfer business process management architecture according to principles of the invention.

An illustrative RESTful BPM architecture according to principles of the invention is shown in FIG. 7. The server side 72 contains a set of resource brokers. Each resource broker manages the instance data 74 and the metadata 73 of the associated business entity. Both meta and instance data are treated as resources. Note that a process may interact with many applications. In this case, the data model of a business entity may just contain a link referencing the metadata of application data, and accordingly, instance data may also have a reference pointing to the location where application data is stored.

A client 70 uses REST interfaces (for example, HTTP methods GET, PUT, POST and DELETE) to request resources from resource brokers. There are two kinds of clients, administrators 75 and regular users 76. An administrator can request metadata of a business entity through GET interface, create a new business entity definition by sending its metadata through PUT interface, modify the definition of a business entity by updating any portion of its metadata through POST interface, or remove the business entity definition using DELETE interface. A regular user may only be able to query metadata through GET without making any change on metadata resources. Similarly, at the instance level, with proper authorization, a user can read, create, update, or delete business entity instances through REST interfaces. For example, when a user sends a request through POST to a resource broker, the broker finds the right business entity, updates its content using the posted data, changes its current state, and creates a response to the user.

Note that REST is a layered architecture. A resource broker in an extended REST model may serve as a client to another resource broker. For example, the service order resource broker acts as a client of the service task broker. It sends a request to the service task broker to create a new instance of service task when OrderExecution service is executed (see FIG. 4(*b*)).

4.5 A SDM Process Execution Scenario

A typical execution scenario in RESTful BPM is shown in FIG. 8. This scenario describes the interactions (R1-R6) for creating a service order.

A client begins the process by invoking a GET on the URI http://www.sdm.com/Order/newOrder (R1) with the intention of creating a new order. In response to R1, the resource broker calls an internal function to get the next available order ID (e.g., "o1"), makes an empty XML document based on the service order metadata, fills order ID and current state as "initial" in this document, looks for the available transitions for the service order in the current state, and returns this document as a response message (R2), shown in FIG. 9(*a*). In addition to the content of the service order o1, the response message also contains meta-information on the explicit state-transfer options available in the initial state along with resource links (identified by tag "xlink") pertinent to these options. For example, "/Order/o1/OrderCreation" in R2 points to a portion of data in business entity o1, which should be filled in order to create an order.

Next, the client issues a GET request on the URI http://www.sdm.com/Order/o1/OrderCreation (R3). The resource broker returns the corresponding representation in (R4). Such a representation, which requires input from the client, is typically rendered as a foam on a browser of the client device. The client fills in the data, for example, ServiceOffering element in FIG. 9(*a*), and submits the data using POST (R5). When the resource broker receives this request, it processes the posted data and updates the service order instance, changes the current state to created, gets a list of available state-transfer options in the new state, and returns a new representation as shown in FIG. 9(*b*) to the client (R6).

5. Illustrative Comparison

Our approach to business process execution is fundamentally different from BPEL (see Business Process Execution Language for Web Services version 1.1) and REST-style workflows (see the above-cited Muehlen et al. reference). BPEL uses workflow constructs (e.g., Flow, Pick, etc.) to define service composition. These constructs specify sequencing constraints on a set of activity nodes. Each activity node may invoke an external service or serve as the target of a service invocation from a client. At execution time, a workflow instance is instantiated based on the workflow definition and this workflow orchestrates the service invocations. A WSDL (Web Service Definition Language) based interface may be defined such that user agents can access the workflow services over the network. REST-style workflows are executed in the same fashion. Control flow based languages are used to define the execution sequences of activities. Clients use REST messages to create a workflow instance which is then identified by a URI. Each activity is a REST resource accessible to clients.

In contrast, in RESTful BPM according to principles of the invention, we view business process execution as the evolution of a collection of business entities through state transitions. These resources are meaningful from a business perspective since they represent the information critical for business users to perform their work. Resource brokers manage the evolution of the value sets of resources by processing service transactions from clients. A resource broker operates under the control of a state machine which imposes sequencing constraints on the service transactions to comply with business policies. Compared with BPEL and REST-style workflow approaches, RESTful BPM has several desirable features as discussed below.

A highly desirable property of BPM solutions is the ability to evolve gracefully as business requirements change. For example, consider that a new input variable is added for the approval task of the SDM process. In BPEL and WSDL based approaches, this leads to changes in the WSDL interface definitions exposed by the BPEL and requires changes to every client of that WSDL service. However, RESTful BPM can accommodate such a change elegantly. This new input variable may cause changes on the metadata of the service order resource, but it does not impact the clients that access the resource since the new variable and its meta data will be automatically provided to the clients when they invoke HTTP GET method on the resource URI. A browser uses the metadata associated with this new variable to render it in a form and the client uses POST methods to send the new data to the server.

Figure 10:
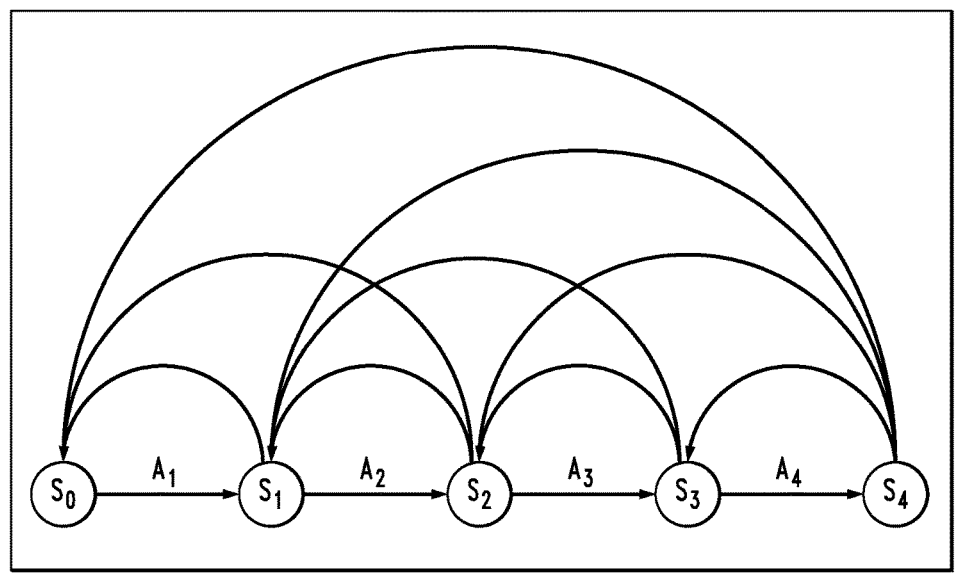
FIG. 10 shows backward navigation for use in illustrating principles of the invention.

Industry practices show that BPEL-based solutions have difficulties in supporting event-driven processes and backward navigation. This problem can be illustrated by a simple example shown in FIG. 10. In FIG. 10, after executing a task (e.g., A2), a process instance may return to a previously-executed task (e.g., A1), if some events happen. In an extreme case, a process instance can step back to any of the previously-executed tasks. Essentially, backward navigation introduces cycles in process models, structured or unstructured. A structured cycle has only one entry point and one exit. An unstructured cycle can have multiple entries or exits. An example is the loop S1→S2→S3→S1, which has two exits, one from S2 and the other from S3. Most workflow engines and BPEL engines only support structured cycles. In addition, it is very cumbersome to represent such a process using BPEL. It has been reported that over 15 nested layers of sequences, flows, and while loops were required to achieve backward navigation and event-driven behavior for a simple order fulfillment process. In contrast, backward navigation and event-driven processes are easy and natural to model in our approach. FIG. 10 is just a normal state machine.

Another problem with BPEL approaches lies in supporting conversational business processes. Such a process exposes multiple interdependent Web service operations to clients. Successful invocations of these operations can occur only if the corresponding pre- and post-conditions are met. The availability of these operations changes as the conversation between the process and the clients goes on. For example, changes in business requirements could cause a client to submit a change request (via a service invocation) to a service order which is already in progress. This might disable the planOrder service while causing the previously disabled validate Order service to be active again. It is difficult to support this kind of dynamic behavior in client programs with BPEL backend. In contrast, RESTful BPM easily supports such processes using a conversation pattern between the client and server composed of a pair of self-describing request and response messages. A response lists all available services in the current state as state transition options (see FIG. 9).

Scalability is another desired property of BPM systems targeted to support the business operations of globally integrated enterprises. In a REST-based system, components interact by reading and writing self-describing messages to the network. As pointed out above, these messages encode resource representations which include resource data and metadata. Network based APIs (application programming interfaces) and self-describing messages make it possible to insert value-added intermediaries between the client and the server. As the volume of service requests increases, additional resource brokers are added as origin servers for service requests and an intermediate server is used to route client requests to appropriate origin servers. Intermediate servers may cache the data to improve performance.

6. Illustrative Computer System

Figure 11:
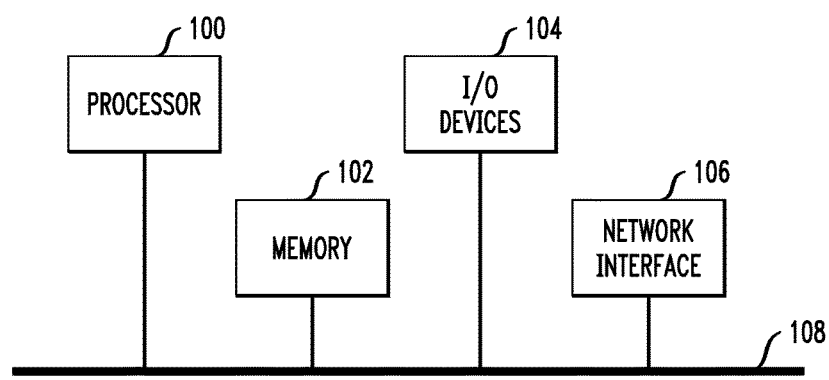
FIG. 11 shows an example of a computer system for implementing a representation state transfer business process management architecture according to principles of the invention.

Lastly, FIG. 11 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 11 may represent one or more client devices, one or more servers, or one or more other processing devices capable of providing all or portions of the functions described herein.

The computer system may generally include a processor 100, memory 102, input/output (I/O) devices 104, and network interface 106, coupled via a computer bus 108 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered an article of manufacture in the form of a computer readable storage medium, e.g., which includes one or more programs (instructions, code, etc.) which may be loaded and executed by a processor (e.g., a processor associated with a server acting as a resource broker).

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Advantageously, as described in detail herein, we have presented an innovative service-oriented architecture for flexible, scalable, and dynamic business process execution and illustrated this approach using a process example. In this approach, we view business processes as the evolution of the value sets of a collection of business entities. The behavior of a business entity is modeled as a Mealy machine We introduce resource brokers as service components managing business entity evolution. By introducing these extensions to REST architecture, we are able to support dynamic, flexible, and scalable business process execution. We have implemented this architecture on a J2EE application server and used it to create business process applications.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus to provide business process management based on a representation state transfer architecture, the apparatus comprising:

a memory configured to store program instructions; and
at least one processor coupled to the memory and configured to execute the stored program instructions to implement a resource broker that is configured to:

manage a plurality of business entities of a business process, the plurality of business entities comprising a first business entity and a second business entity, wherein each business entity of the plurality of business entities is associated with a uniform resource identifier, wherein each business entity of the plurality of business entities comprises an independent component comprising metadata, and wherein the metadata of each business entity comprises (i) a data model comprising one or more data entities, and (ii) a lifecycle model, which is associated with the data model, wherein the lifecycle model comprises a state machine which comprises states and state transitions that are caused by changes to the one or more data entities of the business entity, and wherein for each business entity, each state transition of the lifecycle model of the business entity defines a separate business service of the business entity, which is invoked by the resource broker when the lifecycle model of the business entity is in a source state of a transition associated with business service; and manage an evolution of the lifecycle model and the data model of the first business entity by processing a client request for the first business entity to generate one or more resource representations on demand for the first business entity in response to the client request;

wherein the one or more resource representations of the first business entity are generated on demand by the resource broker executing a process comprising:

updating information content of a given data entity of the data model associated with the first business entity with input data provided by the client request;

performing a state transition of the lifecycle model of the first business entity based on the updated information content of the given data entity to update a current state of the lifecycle model of the first business entity; and generating a response to the client request, wherein the response comprises a resource representation of the first business entity in the current state;

wherein performing the state transition of the lifecycle model of the first business entity further comprises the first business entity communicating with the second business entity in response to the state transition of the lifecycle model of the first business entity invoking a business service of the second business entity; and wherein generating the response to the client request further comprises executing the first and second business entities independently, in response the business service of the first business entity invoking the business service of the second business entity.

2. The apparatus of claim 1, wherein the at least one processor is further configured to implement at least one business entity of the plurality of business entities as a temporally varying membership function which, for a given time, maps the at least one business entity to one or more data entities.

3. The apparatus of claim 1, wherein the at least one processor dynamically generates a new data entity of the first business entity, subject to the client request, by changing a value set of an existing data entity of the first business entity.

4. The apparatus of claim 3, wherein the at least one processor generates a resource representation of the first business entity based on the new data entity.

5. The apparatus of claim 1, wherein the resource representation comprises meta-information on one or more state-transfer options available in a given state along with one or more resource links associated with the one or more state-transfer options.

6. The apparatus of claim 1, wherein the resource broker is configured to send the response to the client, wherein the response comprises the resource representation of the first business entity in the current state.

7. A method to provide business process management based on a representation state transfer architecture, comprising:

implementing a resource broker that is configured for:

managing a plurality of business entities of a business process, the plurality of business entities comprising a first business entity and a second business entity, wherein each business entity of the plurality of business entities is associated with a uniform resource identifier, wherein each business entity of the plurality of business entities comprises an independent component comprising metadata, and wherein the metadata of each business entity comprises (i) a data model comprising one or more data entities, and (ii) a lifecycle model, which is associated with the data model, wherein the lifecycle model comprises a state machine which comprises states and state transitions that are caused by changes to the one or more data entities of the business entity, and wherein for each business entity, each state transition of the lifecycle model of the business entity defines a separate business service of the business entity, which is invoked by the resource broker when the lifecycle model of the business entity is in a source state of a transition associated with business service; and managing an evolution of the lifecycle model and the data model of the first business entity by processing a client request for the first business entity to generate one or more resource representations on demand for the first business entity in response to the client request;

wherein the one or more resource representations of the first business entity are generated on demand by the resource broker executing a process comprising:

updating information content of a given data entity of the data model associated with the first business entity with input data provided by the client request;

performing a state transition of the lifecycle model of the first business entity based on the updated information content of the given data entity to update a current state of the lifecycle model of the first business entity; and generating a response to the client request, wherein the response comprises a resource representation of the first business entity in the current state;

wherein performing the state transition of the lifecycle model of the first business entity further comprises the first business entity communicating with the second business entity in response to the state transition of the lifecycle model of the first business entity invoking a business service of the second business entity; and wherein generating the response to the client request further comprises executing the first and second business entities independently, in response the business service of the first business entity invoking the business service of the second business entity.

8. The method of claim 7, further comprising implementing at least one business entity of the plurality of business entities as a temporally varying membership function which, for a given time, maps the at least one business entity to one or more data entities.

9. The method of claim 7, further comprising generating a new data entity of the first business entity, subject to the client request, by changing a value set of an existing data entity of the first business entity.

10. The method of claim 9, wherein generating one or more resource representations on demand comprises generating a resource representation of the first business entity based on the new data entity.

11. The method of claim 7, wherein the resource representation comprises meta-information on one or more state-transfer options available in a given state along with one or more resource links associated with the one or more state-transfer options.

12. The method of claim 7, further comprising sending the response to the client, wherein the response comprises the resource representation of the first business entity in the current state.

13. An article of manufacture comprising a non-transitory computer readable recordable storage medium having computer executable program code stored thereon which, when executed by a computer, perform method steps to manage resources of a business process based on a representation state transfer architecture, wherein the method steps comprise:

implementing a resource broker that is configured for:
managing a plurality of business entities of a business process, the plurality of business entities comprising a first business entity and a second business entity, wherein each business entity of the plurality of business entities is associated with a uniform resource identifier, wherein each business entity of the plurality of business entities comprises an independent component comprising metadata, and wherein the metadata of each business entity comprises (i) a data model comprising one or more data entities, and (ii) a lifecycle model, which is associated with the data model, wherein the lifecycle model comprises a state machine which comprises states and state transitions that are caused by changes to the one or more data entities of the business entity, and
wherein for each business entity, each state transition of the lifecycle model of the business entity defines a separate business service of the business entity, which is invoked by the resource broker when the lifecycle model of the business entity is in a source state of a transition associated with business service; and
managing an evolution of the lifecycle model and the data model of the first business entity by processing a client request for the first business entity to generate one or more resource representations on demand for the first business entity in response to the client request;
wherein the one or more resource representations of the first business entity are generated on demand by the resource broker executing a process comprising:
updating information content of a given data entity of the data model associated with the first business entity with input data provided by the client request;
performing a state transition of the lifecycle model of the first business entity based on the updated information content of the given data entity to update a current state of the lifecycle model of the first business entity; and
generating a response to the client request, wherein the response comprises a resource representation of the first business entity in the current state;
wherein performing the state transition of the lifecycle model of the first business entity further comprises the first business entity communicating with the second business entity in response to the state transition of the lifecycle model of the first business entity invoking a business service of the second business entity; and
wherein generating the response to the client request further comprises executing the first and second business entities independently, in response the business service of the first business entity invoking the business service of the second business entity.

14. The article of manufacture of claim 13, wherein at least one business entity of the plurality of business entities is implemented as a temporally varying membership function which, for a given time, maps the at least one business entity to one or more data entities.

15. The article of manufacture of claim 13, wherein the method steps further comprise generating a new data entity of the first business entity, subject to the client request, by changing a value set of an existing data entity of the first business entity.

16. The article of manufacture of claim 15, wherein generating one or more resource representations on demand comprises generating a resource representation of the first business entity based on the new data entity.

17. The article of manufacture of claim 13, wherein the resource representation comprises meta-information on one or more state-transfer options available in a given state along with one or more resource links associated with the one or more state-transfer options.

18. The article of manufacture of claim 13, wherein the method steps further comprise sending the response to the client, wherein the response comprises the resource representation of the first business entity in the current state.

* * * * *